United States Patent
Chen et al.

[11] Patent Number: 6,076,107
[45] Date of Patent: Jun. 13, 2000

[54] METHOD FOR REDUCING SNMP INSTRUMENTATION MESSAGE FLOWS

[75] Inventors: David De-Hui Chen, Cary; William Frank McKenzie, Raleigh; Keith Irwin Meyer, Raleigh; Leo Temoshenko, Raleigh, all of N.C.

[73] Assignee: International Business Machines Corporation, Armonk, N.Y.

[21] Appl. No.: 08/781,224

[22] Filed: Jan. 10, 1997

Related U.S. Application Data

[62] Division of application No. 08/437,070, May 9, 1995.

[51] Int. Cl.[7] .................................................... G06F 17/30
[52] U.S. Cl. ......................... 709/224; 709/226; 709/217; 709/202
[58] Field of Search ........................ 395/200.54, 200.56, 395/200.47, 200.32; 709/224, 226, 217, 202

[56] References Cited

U.S. PATENT DOCUMENTS

| | | | |
|---|---|---|---|
| 5,751,967 | 5/1998 | Raab et al. | 395/200.58 |
| 5,778,377 | 7/1998 | Marlin et al. | 707/103 |
| 5,822,569 | 10/1998 | McPartlan et al. | 395/500 |

*Primary Examiner*—Zarni Maung
*Assistant Examiner*—Saleh Najjar
*Attorney, Agent, or Firm*—John J. Timar

[57] ABSTRACT

A method of data retrieval reduces the number of Instrumentation message flows in a Simple Network Management Protocol (SNMP) device. The method uses "look-ahead" algorithms whereby data items which have not yet been requested by the Agent (but are expected to be) are retrieved from Instrumentation. The method comprises the step of retrieving from the Instrumentation an entire row of data from an SNMP table whenever a GetRequest or GetNextRequest Protocol Data Unit (PDU) is issued by the Manager to the Agent. A SubAgent saves this row in anticipation of a subsequent request for another column in this same row thereby eliminating the need for further Instrumentation message flows for further data retrieval from this row. Whenever a new GetRequest is issued by the Manager, a new set of data is retrieved from the Instrumentation. The method further comprises the step of retrieving the next subsequent data item in response to a GetNextRequest against the last row in a given column thereby eliminating the need for a second message exchange at an "end of column" condition.

12 Claims, 7 Drawing Sheets

METHOD FOR REDUCING SNMP INSTRUMENTATION MESSAGE FLOWS

CROSS-REFERENCE TO RELATED APPLICATIONS

This is a divisional of application Ser. No. 08/437,070 filed on May 9, 1995.

This is related to the following commonly assigned applications: D. Chen et al., *System and Method for Monitoring SNMP Tables*, Ser. No. 08/042,952, D. Chen et al., *System and Method for Controlling, Monitoring and Retrieving Accounting Data*, Ser. No. 08/105,543 now U.S. Pat. No. 5,706,508, and D. Chen et al., *System and Method for Recording Accounting Times*, Ser. No. 08/123,547 now U.S. Pat. No. 5,557,746.

BACKGROUND OF THE INVENTION

I. Field of the Invention

The present invention relates to network management using the Simple Network Management Protocol (SNMP) and, more particularly, to a method of reducing the number of message flows to and from an Instrumentation in an SNMP device.

II. Background and Prior Art

Data communication has become a fundamental part of computing. World-wide networks gather data about such diverse subjects as atmospheric conditions, crop production, and airline traffic. These networks evolved as independent entities without the ability, or, until recently, the need, to interconnect with one another. New technologies, generically named "internetworking", have emerged making it possible to interconnect many disparate physical networks and make them function as a coordinated unit. Using internetworking technologies, a host, for example, on one network, may traverse multiple networks and communicate with another host on a different network.

The size of an "internet", or group of interconnected networks, can vary quite significantly. For instance, the resulting network may be enormously large, such as the nation-wide DARPA (Defense Advanced Research Projects Agency)/NSF (National Science Foundation) Internet which connects most major research institutions, including universities, corporate and government labs. Conversely, the network may be relatively small, comprising only a single corporation's individual local area networks (LANs).

No matter the size of the network, it is clear that the task of effectively managing the resulting interconnected network is quite important and has been given a great deal of attention in the networking community. In managing a network, a network manager must keep track of the devices on the networks, monitor the network's performance and load, and diagnose and correct any problems.

While products that manage homogeneous networks have been available, managing heterogeneous networks is more complex and, until recently, no generally accepted heterogeneous network management standard existed. The Simple Network Management Protocol (SNMP), which originated as a means for managing the TCP/IP (Transmission Control Protocol/Internet Protocol) and Ethernet networks, has broadened rapidly since its monitoring and control transactions are completely independent of TCP/IP and Ethernet. SNMP only requires datagram transport mechanisms to operate.

Using SNMP, network administrators can address queries and commands to network nodes and devices. SNOB monitors network performance and status; controls operational parameters; and reports, analyzes and isolates these faults. The protocol accomplishes these functions by transporting management information between "Managers" and "Agents".

SNMP defines the following three basic components:

1. An Agent, a component housed within a managed network device such as a host, gateway, or terminal server. Each Agent stores management data and responds to the Manager's requests for this data, and may send a "TRAP", a special unsolicited SNMP command, to the Manager after sensing a prespecified condition 2. A Manager, a component housed within a Network Management Station. The Manager queries/controls Agents using various SNMP commands.

3. A Management Information Base (MIB), a managed object database, accessible to Agents and manipulated via SNMP for network management application.

To carry out the Agent's and Manager's duties, SNMP specifies five types of commands or verbs, called Protocol Data Units (PDUs): GetRequest, GetNextRequest, SetRequest, GetResponse and Trap. (The SetRequest and Trap PDUs are unrelated to the present application and will not be discussed.) Agents inspect and retrieve the specified table values after receiving either a GetRequest or a GetNextRequest PDU from a Manager. Managers use GetRequest for retrieving single values. The GetNextRequest is issued by the Manager to begin a primitive block transfer and the Agent returns the selected data with a GetResponse verb.

Conceptually, SNMP employs tables to store the information in the MIB. These tables consist of rows and columns. FIG. 1 illustrates a typical SNMP table. Columns are attributes, or object types in SNMP terms, that characterize the resources. Each row represents an instance of the resource. Examples of resources, represented by the rows, are network links, communication sessions, and network adapters, which are installed in the Managed Device. Examples of resource attributes, represented by the columns, are name (e.g., link name, session name, adapter name), status (e.g., link up/down, session started/stopped, adapter on-line/off-line), and various counters (such as the number of datagrams routed during the session). Because resources, such as sessions and links, can go up and down and new ones may be created, the configuration of the rows of the table are dynamic. By contrast, the resource attributes, represented by the columns, do not change (i.e., are static). An SNMP GetRequest or GetNextRequest of a single object allows a manager to retrieve an instance of the object. The SNMP GetRequest and GetNextRequest also allow the retrieval of a set of objects with one request. Although, SNMP does not restrict what objects should be requested in one PDU, most managers will retrieve information (either whole or a subset) from a row. The Agent treats each object in the PDU as a separate request and passes it to the SubAgent. This is demonstrated in FIG. 2 as discussed below.

FIG. 2 illustrates a system 20 conforming to SNMP. In order to assist in managing and organizing the vast amounts of data which need to be collected and maintained for access by the Manager 22 in the Network Management Station 24, the Agent 26 of the managed network device 28 may use one or more SubAgents (one SubAgent 30 shown) for manipulating the data items in the various tables. Each SubAgent may be responsible for a particular table or set of tables. In order to access the particular tables, the SubAgents issue commands to the managed network device Instrumentation 32, which actually maintains the physical data items.

In order to retrieve all the data items in a given row, the Manager would issue a GetRequest or GetNextRequest to the Agent. The command would specify the specific data location, i.e., (row 1, col. 1), (row 1, col. 2), ... (row m, col. n) of the desired data items so that one PDU is issued for multiple data items. The Agent then individually passes a request for each data item to the SubAgent which, in tun, passes it to the Instrumentation. The Instrumentation responds for each request to the requesting SubAgent which, in turn, responds to the Agent. The Agent subsequently collects all the results and responds to the Manager the requested data item values, normally with a single GetResponse PDU.

This is shown in a conceptual block diagram in FIG. 2. Agent 26 must provide the function of receiving requests from the Manager 22, processing those requests, and issuing requests to the SubAgent 30. This function is indicated by block 44. Similarly, Agent 26 must provide the function of receiving responses to those issued requests, temporarily storing the responses in an internal storage area, and issuing responses to the Manager 22. These functions are shown by block 50 and internal storage block 56. Likewise, SubAgent 30 must provide the function of receiving requests from the Agent 26, processing those requests, and issuing requests to the Instrumentation 32. This function is identified by block 46. Similarly, SubAgent 30 must provide the function of receiving responses to those issued requests in block 52, temporarily storing the responses in an internal storage area 58, and issuing responses to the Manager 22 with block 52. Instrumentation 32 has similar function blocks 48, 54 and 60.

As shown in FIG. 2, Manager 22 issues a single GetRequest PDU (GetReq 1) for the desired data items ((1, 1), (1, 2), (1, 3)). (Alternatively, the Manager may issue multiple PDUs specifying the desired data items.) Agent 26 receives this PDU and sends a first request for the first data item (Req 1 (1, 1)) to SubAgent 30 via block 44, which, in turn, forwards it to Instrumentation 32 via block 46. Instrumentation retrieves the data item from the table (in storage 60) and sends it to SubAgent 30 (Resp 1 (1, 1)) using block 52, which forwards it to Agent 26. Agent 26 then forwards the next request (Req 2 (1, 2)), and likewise Req 3 (1, 3), to the SubAgent 30 for the same retrieval process. When Agent 26 has received all of the data items using block 50 and internal storage 56, it sends them to Manager 22 via a single GetResponse PDU (GetResp 1 (1, 1), (1, 2), (1, 3)).

This one-for-one exchange between the SubAgent and the Instrumentation is costly in terms of processing time. Each request issued by the SubAgent to the Instrumentation consumes processing time which the Instrumentation would otherwise be devoting to another task such as routing incoming datagrams, if the managed network device was a router, for example. If, for instance, the Manager wishes to retrieve a network device status table consisting of 1000 rows and 50 columns in order to provide a graphical user interface depicting a network map, the Instrumentation would be required to process 50,000 information requests.

A large number of exchanges between the SubAgent and the Instrumentation severely degrades the performance of the managed network device. During the time the Instrumentation is processing these information requests, in the case where the managed network device is a router, network traffic can not be routed. Thus, the more the device is managed using traditional methods, the less it is able to perform its primary routing/networking functions.

Additionally, when a single Manager PDU Request causes a large number of individual messages to be exchanged between the SubAgent and the Instrumentation, a great deal of time may elapse between the first message exchange and the last. During that time, conditions which the Instrumentation is monitoring may change. This is a problem as the Manager cannot be ensured that it has obtained a "snapshot" of the condition at one instant in time as the condition may or may not be dynamic.

Another problem with this prior art SNMP data retrieval system is that when a GetNextRequest is issued to the Instrumentation when at the end of a column of data, i.e., at the last row in the column, a "noSuchName" response is generated. (A GetNextRequest retrieves the name and value of the next resource instance in the table, i.e., it retrieves the next data item in the same column but in the subsequent row.) A second GetNextRequest must be issued so that the first data item of the following column may be retrieved. In other words, where a table has "m" rows and "n" columns, a GetNextRequest (Row m, Col. x) where "x" is any column number no greater than "n", a noSuchName response is sent back to the SubAgent Another GetNextRequest (0, Col. x+1) must be issued to Instrumentation for retrieving the data item located at (Row 1, Col. x+1). This additional message exchange between the Instrumentation and the SubAgent exacerbates the problem of high numbers of processing requests further distracting the Instrumentation from its primary responsibility.

FIG. 3 illustrates a prior art SNMP retrieval system at the other extreme. As in the prior art system of FIG. 2, Agent 26 comprises functional blocks 44 and 50 for receiving, processing and forwarding requests to/from the SubAgent from/to the Manager and internal storage 56 for temporarily storing responses. Likewise, SubAgent 31 (and Instrumentation 33) has functional blocks 47 and 53 (48 and 54) for receiving, processing and forwarding requests to/from the Agent (SubAgent) from/to the Instrumentation (SubAgent) and internal storage 58 (60) for temporarily storing responses (for storing data items). Manager 22 issues a GetRequest PDU (GetReq1 (1, 1), (1, 2), (1, 3)) to Agent 26 which sends individual requests for each data item to SubAgent 31. SubAgent 31 issues a generic Req command using block 47 to Instrumentation 33 which responds by sending its entire database (All Rows, All Cols.) to SubAgent 31. SubAgent 31 sends the individual data items back to Agent 26 in response to requests which collects them for forwarding to Manager 22.

While reducing the individual SubAgent-Instrumentation message flows, this method of retrieving data from the Instrumentation is inefficient for a number of reasons. First, by the Instrumentation doing a complete "data dump" to the SubAgent whenever there is a data item request, the SubAgent is required to provide a great deal of internal storage. Duplicate copies of the entire database are maintained which is wasteful as the database may be huge. Second, often times, the data maintained by the Instrumentation is dynamic so that subsequent GetRequests from the Manager will result in inaccurate data retrieval from the SubAgent as the data stored therein is untimely. Finally, frequently, SubAgents protect against old, inaccurate data by dumping its stored data after a predetermined period of time. This merely causes further complete Instrumentation data dumps whenever a data item is requested.

SUMMARY OF THE INVENTION

A method of data retrieval reduces the number of Instrumentation message flows in a Simple Network Management Protocol (SNMP) device. The method uses "look-ahead"

algorithms whereby data items which have not yet been requested by the Agent (but are expected to be) are retrieved from Instrumentation. The method comprises the step of retrieving from the Instrumentation an entire row of data from an SNMP table whenever a GetRequest or GetNextRequest Protocol Data Unit (PDU) is issued by the Manager to the Agent. A SubAgent saves this row in anticipation of a subsequent request for another column in this same row thereby eliminating the need for further Instrumentation message flows for further data retrieval from this row. Whenever a new GetRequest specifying a new row is issued by the Manager, a new set of data (a new row) is retrieved from the Instrumentation while the previously stored row of data is discarded. The method further comprises the step of retrieving the next subsequent data item (the entire row) in response to a GetNextRequest against the last row in a given column thereby eliminating the need for a second message exchange at an "end of column" condition.

BRIEF DESCRIPTION OF THE DRAWINGS

While the technical description concludes with claims particularly pointing out and distinctly claiming that which is regarded as the invention, details of a preferred embodiment of the invention may be more readily ascertained from the following technical description when read in conjunction with the accompanying drawings, where:

DETAILED DESCRIPTION OF THE PREFERRED EMBODIMENT

The method of the present invention is utilized in a system conforming to the Simple Network Management Protocol (SNMP). By using "look-ahead" algorithms, the method reduces the number of exchanged messages between the Instrumentation portion of the managed network device and the SubAgent portion of the managed network device during a data retrieval process. In particular, the method of the present invention takes advantage of the premise that, during the process of managing a network, many times the Manager will need to analyze groups of related data items from tables in the managed network device, rather than individual, isolated data items. For example, where the table is maintained with data items indicating errors or faults occurring with relation to the managed network device, i.e., a problem determination table, the Manager will need to analyze all or most of the fault indicating data in order to determine what is causing the various problems. So, where the Manager requests the retrieval of one data item, it is expected that the Manager will soon be requesting for retrieval of related data items. These related data items are normally grouped together in rows.

Moreover, data maintained by the Instrumentation is frequently dynamic in nature. The data retrieval system must, therefore, consider this so that accurate data is returned to the Manager. Finally, a Manager often needs a "snapshot", or a picture at one point in time, of a group of related items which it requests using a single GetRequest or GetNextRequest PDU. The present invention accounts for each of these considerations by providing a unique system and method of retrieving data from Instrumentation using a reduced number of message flows while providing accurate and timely data for the Manager.

Figure 1:
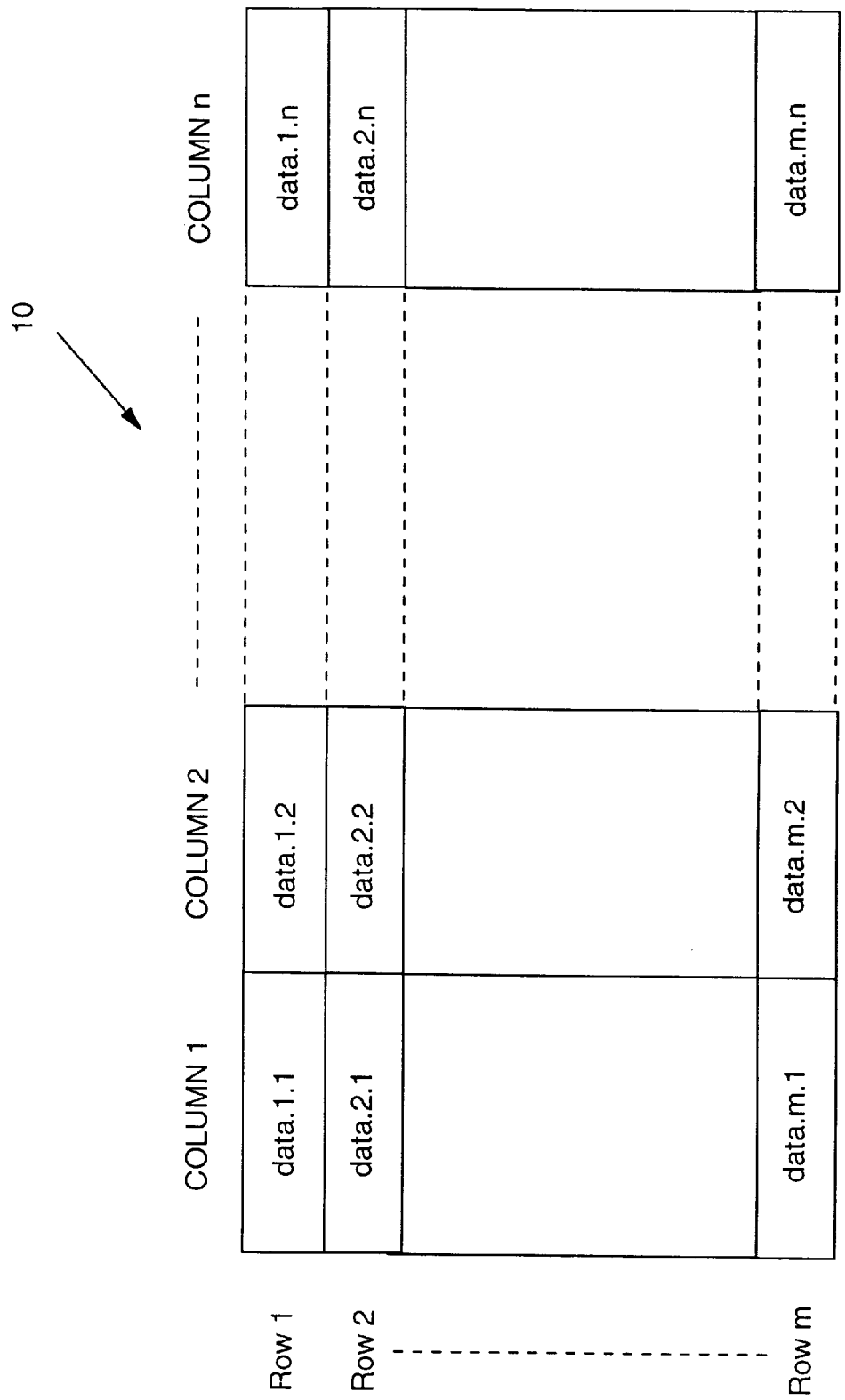
FIG. 1 is an illustration of table which may be used in a Simple Network Management Protocol (SNMP) managed device.
Figure 2:
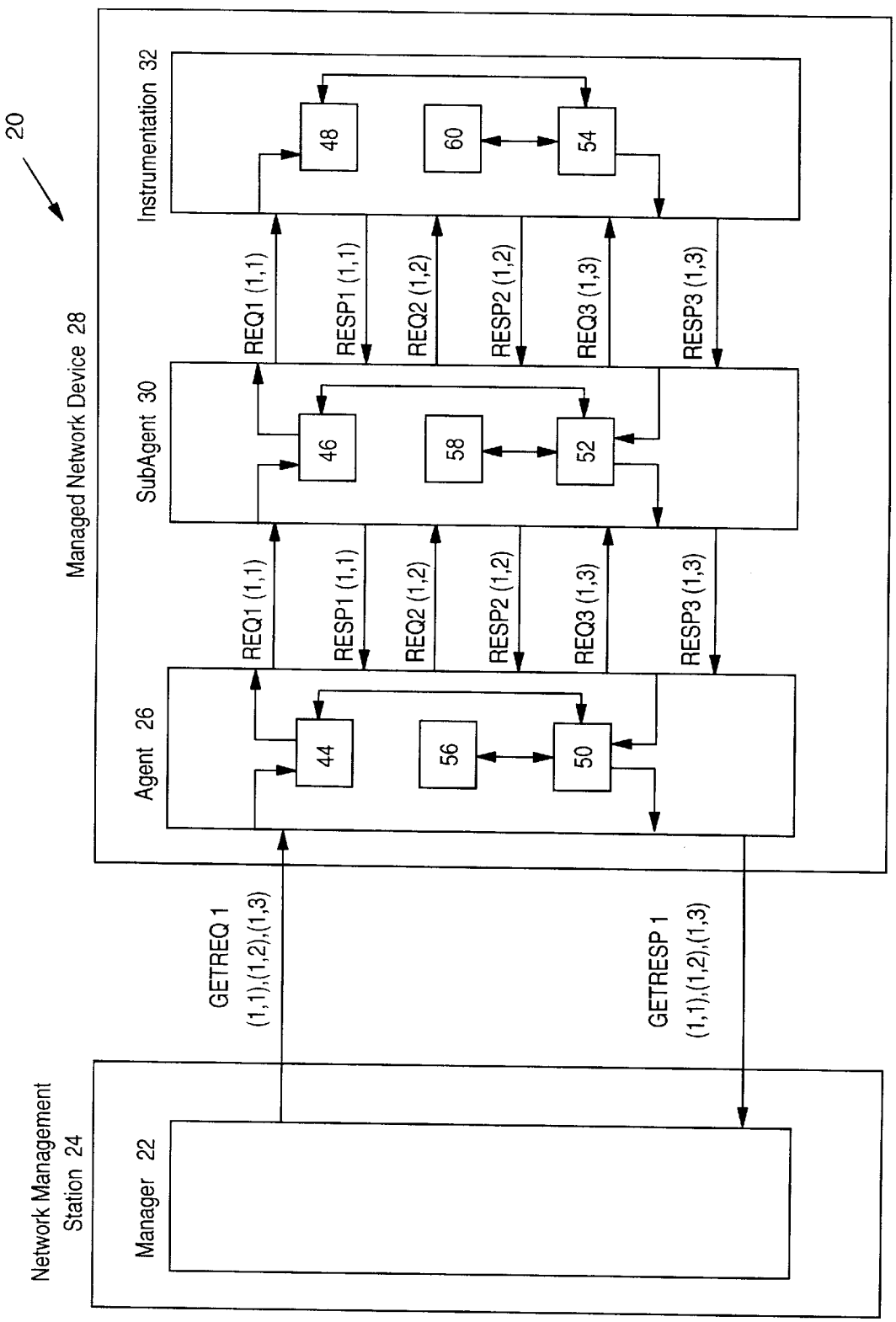
FIG. 2 is a block diagram illustrating the message exchanges occurring between a Manager, an Agent, a SubAgent and an Instrumentation during a traditional SNMP block transfer function.
Figure 3:
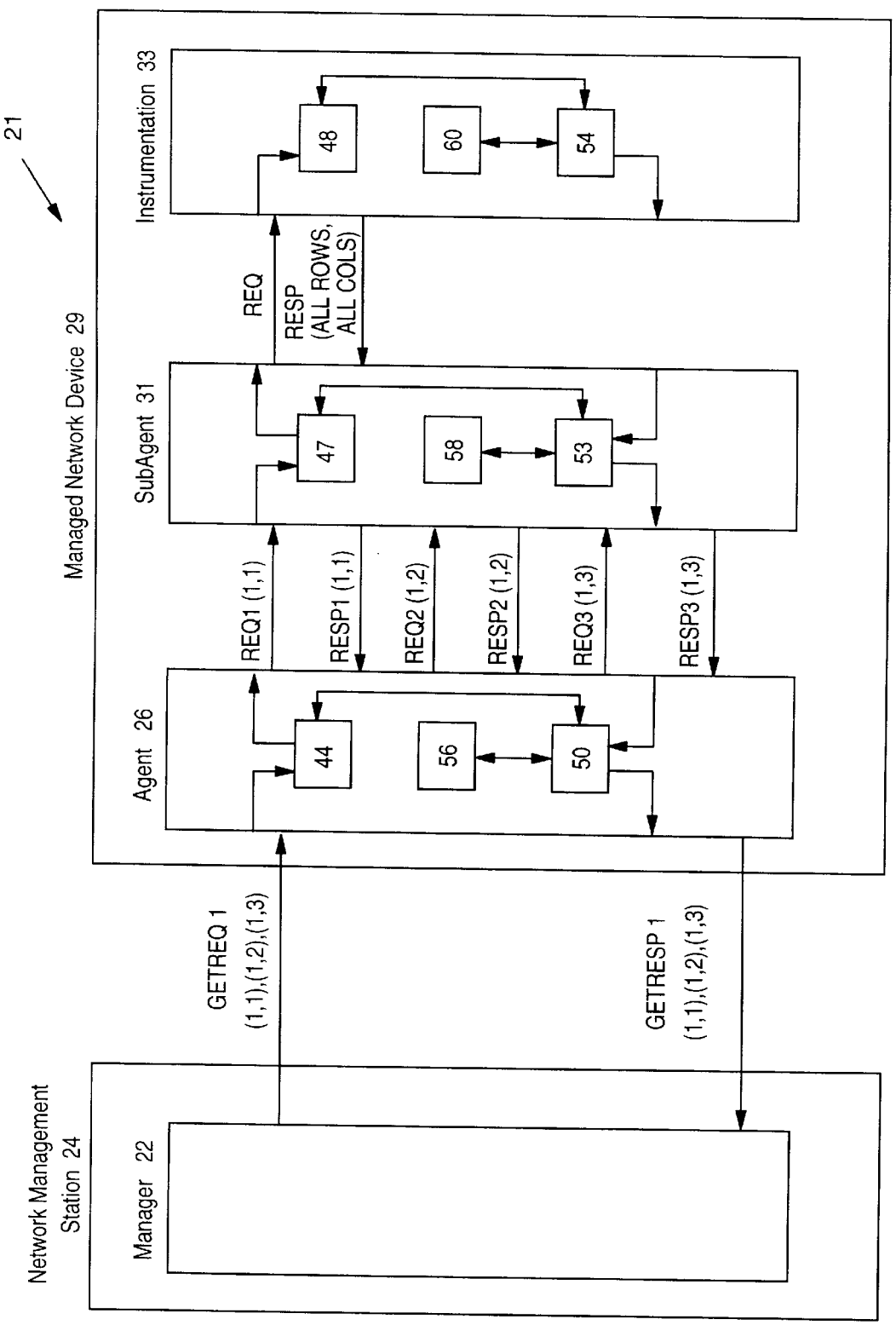
FIG. 3 is a block diagram of another prior art SNMP data retrieval system illustrating the message exchanges occurring between a Manager, an Agent, a SubAgent and an Instrumentation during an SNMP block transfer.
Figure 4:
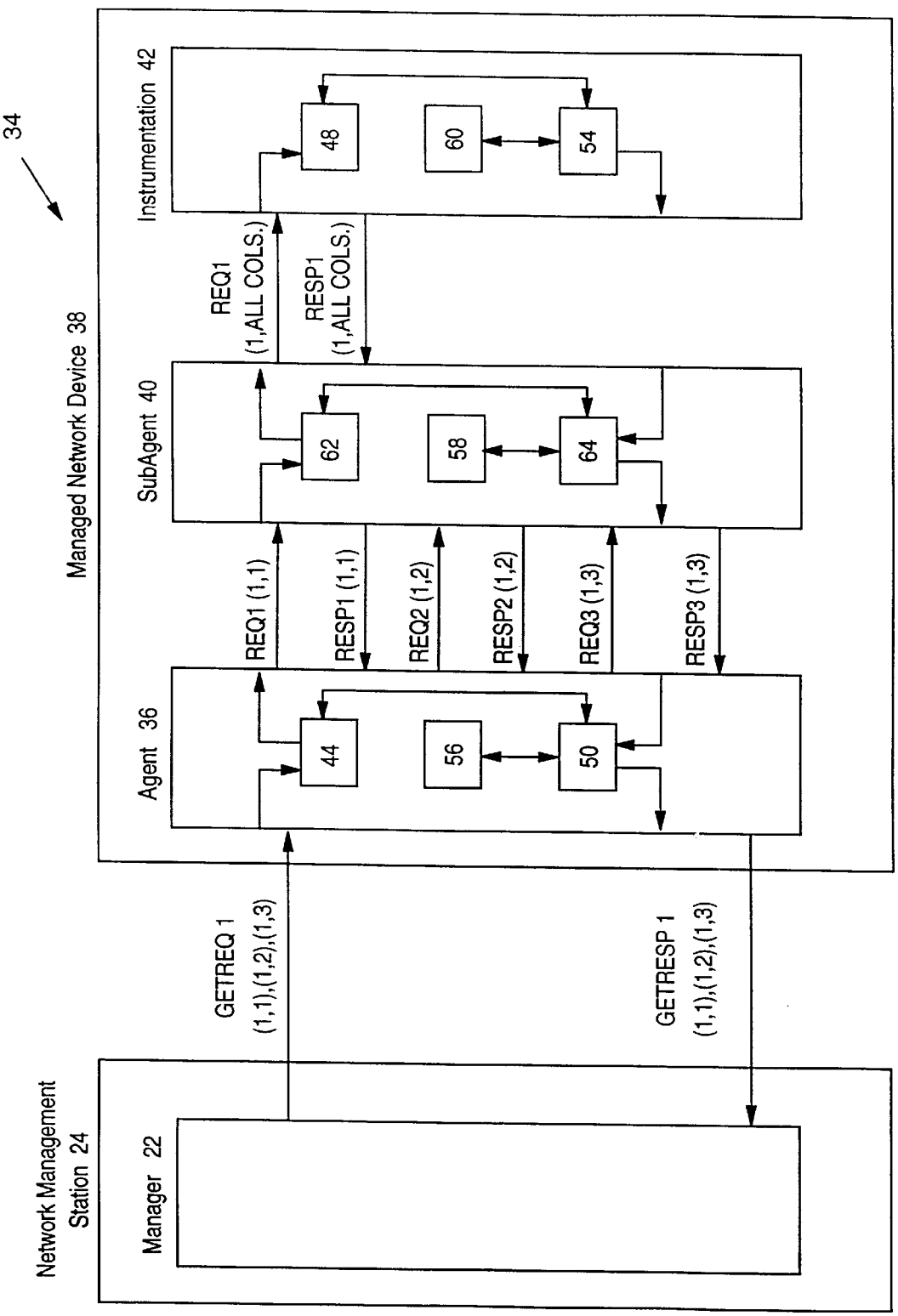
FIG. 4 is a block diagram illustrating the message exchanges occurring between a Manager, an Agent, a SubAgent and an Instrumentation during an SNMP data retrieval process of the present invention.

FIG. 4 is a block diagram of an SNMP system 34 illustrating the message exchanges occurring between a Manager 22 in a Network Management Station 24, and Agent 36, a SubAgent 40 and Instrumentation 42 of the managed network device 38, during an SNMP data retrieval process of the present invention. As discussed above, each of the Managed Device's components performs certain functions. In particular, Agent 36 comprises functional blocks 44 and 50 for receiving, processing and forwarding requests to/from the SubAgent from/to the Manager and internal storage 56 for temporarily storing responses. Likewise, SubAgent 40, of the present invention, (and Instrumentation 42) has functional blocks 62 and 64 (48 and 54) for receiving, processing and forwarding requests to/from the Agent (SubAgent) from/to the Instrumentation (SubAgent) and internal storage 58 (60) for temporarily storing responses (for storing data items). This is illustrated as the preferred embodiment of the present invention although other equivalent configurations can work equally as well. For example, a SubAgent 40 is shown as acting as an interface between the Agent 36 and the Instrumentation 42. The SubAgent is unnecessary but rather merely preferred. The method and system of the present invention focus on the reduction of Instrumentation message flows - whether the Agent directly corresponds with the Instrumentation or has the SubAgent as a liaison is immaterial.

As can be seen, the Manager 22 issues a single GetRequest Protocol Data Unit (PDU) for three data items ((1, 1), (1, 2), (1, 3)) to the Agent 36 of the managed network device 38. Agent 36 forwards the request for the first data item (Req 1 (1, 1)) to SubAgent 40. SubAgent 40, via block 62, instead of merely forwarding the identical request to Instrumentation 42, issues a request for retrieving the entire contents of row 1 (Req 1 (1, All Cols.)). Instrumentation retrieves the contents of row 1 and sends them to SubAgent 40 (Resp 1 (1, All Cols.)).

SubAgent 40 via block 64 receives the contents of row 1 and stores them in internal storage area 58 which it maintains for future use. SubAgent 40, via block 64, then forwards to Agent 36 (Resp 1 (1, 1)) the contents of the table location defined by row 1, column 1.

Agent 36 forwards the request for the next data item to SubAgent 40 (Req 2 (1, 2)). SubAgent 40, having stored the contents of row 1 in its internal storage area 58, retrieves, using block 64, the requested data items and returns it to Agent 36 (Resp 2 (1, 2)). The third data item request from the Agent 36 is handled in the same way by the SubAgent until a data item from another row is requested by a GetRequest. Once Agent 36 has received all responses, Agent 36, in turn forwards them in a single GetResponse PDU (GetResp 1 (1, 1), (1, 2), (1, 3)) to Manager 22.

Figure 5:
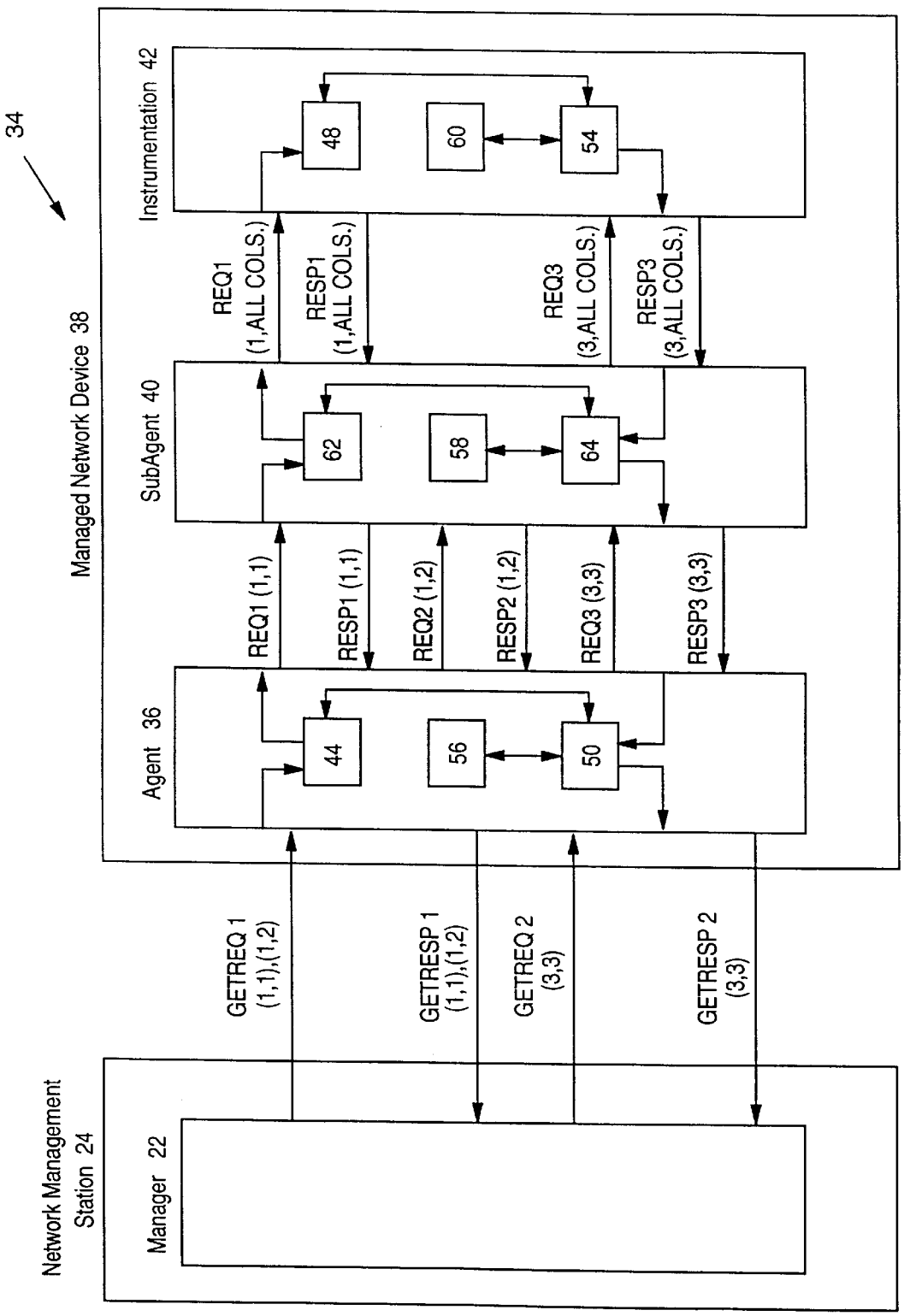
FIG. 5 is a block diagram illustrating the message exchanges occurring between a Manager, an Agent, a SubAgent and an Instrumentation during another SNMP data retrieval process of the present invention.

Old data is discarded so that the Manager may receive timely data which is imperative due to the dynamic nature of the managed system. In particular, once a request is received by the SubAgent for a data item in a different row than the previous request, the previously stored data is discarded. As shown in FIG. 5, the Manager 22 initially issues a single GetRequest PDU for two data items ((1, 1), (1, 2)) to the Agent 36 of the managed network device 38. As discussed above, Agent 36 forwards the request for the first data item (Req 1 (1, 1)) to SubAgent 40 which, in turn, issues a request for retrieving the entire contents of row 1 (Req 1 (1, All Cols.)). Instrumentation retrieves the contents of row 1 and sends them to SubAgent 40 (Resp 1 (1, All Cols,)) which stores them in internal storage area 58 which it maintains for future use. SubAgent 40, via block 64, then forwards to Agent 36 (Resp 1 (1, 1)) the contents of the table location defined by row 1, column 1. Agent 36 forwards the request for the next data item to SubAgent 40 (Req 2 (1, 2)). SubAgent 40 retrieves, using block 64, the requested data items and returns it to Agent 36 (Resp 2 (1, 2)). Once Agent 36 has received all responses, Agent 36, in turn forwards them in a single GetResponse PDU (GetResp 1 (1, 1), (1, 2)) to Manager 22.

Manager 22 then issues a single GetRequest PDU for a single data item ((3, 3)) to the Agent 36 of the managed network device 38. Agent 36 forwards the request for the data item (Req 3 (3, 3)) to SubAgent 40. SubAgent 40, via block 62, issues a request for retrieving the entire contents of row 3 (Req 3 (3, All Cols.)) while at the same time discarding the contents of row 1 stored in its internal storage area 58. In this way, "old" data is discarded and "fresh" data will be requested the next time a data item from row 1 is requested. The basic data retrieval process discussed above is utilized by Instrumentation 42, SubAgent 40 and Agent 36 to return data item (3, 3) to Manager 22 using GetResp 2 (3, 3).

Figure 6:
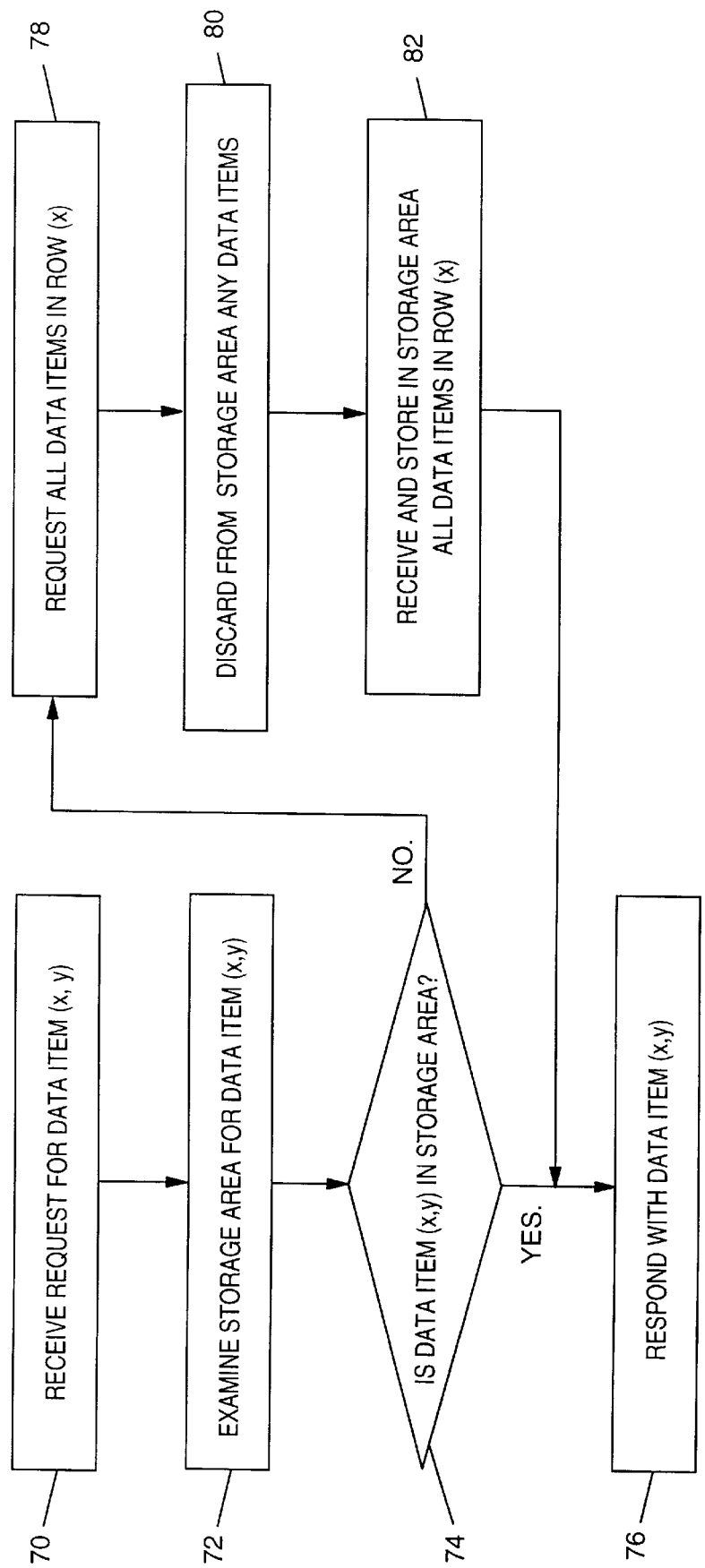
FIG. 6 is a flow chart illustrating the processing logic performed by the Sub Agent of the present invention.

A flow chart of the steps involved in SubAgent 40 is shown in FIG. 6. At 70, the SubAgent receives a request for the data item in a table defined by the location (row x, column y), or data item (x, y). At 72, the SubAgent examines its internal storage area to determine whether the data item (x, y) is already stored there. At 74, if data item (x, y) is in the internal storage area, the SubAgent responds (to Agent) with data item (x, y) at 76. If not, at 78, the SubAgent requests (to Instrumentation) all data items in row (x). At 80, the SubAgent discards from its internal storage area any data items that were previously stored therein. It should be noted that these two steps could be performed in reverse order and the method would function substantially equivalently. However, by performing the steps in the order initially described, the Instrumentation is allowed to perform its internal data item retrieval process while the SubAgent is cleaning its internal memory—thereby saving some time. At 82, the SubAgent receives and stores all the data items in row (x) and, once again, the SubAgent responds (to Agent) with data item (x, y) at 76.

As can clearly be seen, the method employed by the SubAgent significantly reduces the message flow to and from the Instrumentation when a series of data items are requested by the Manager during a single PDU. This frees up processing time for the Instrumentation to provide its primary services, such as protocol routing in the case of a router. When the Manager issues a new GetRequest or GetNextRequest PDU, a new series of data items are retrieved from the Instrumentation and the old ones are discarded so that a "snapshot" of a particular condition may be obtained and so that the data items sent to the Agent are timely and accurate.

Figure 7:
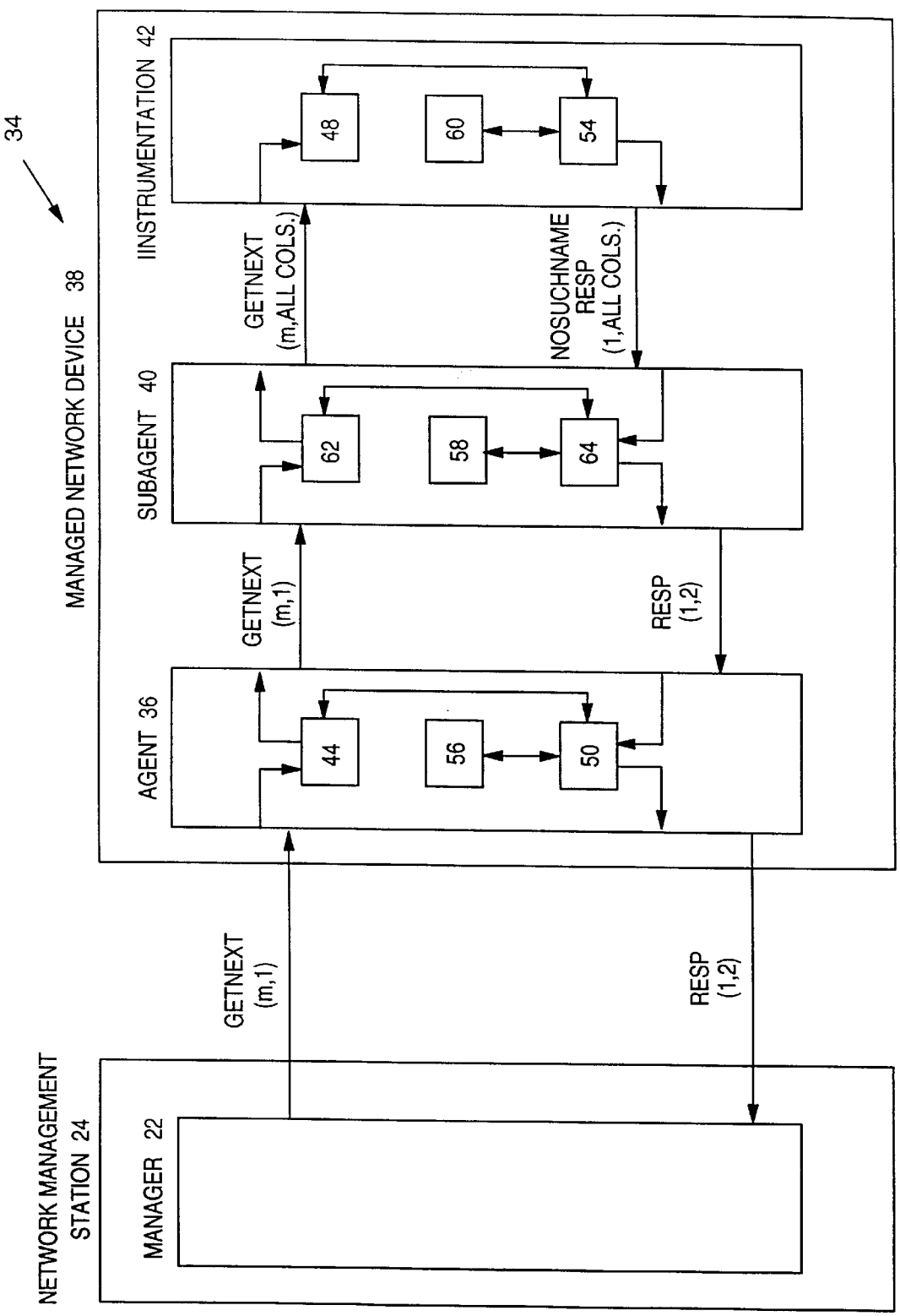
FIG. 7 is a block diagram illustrating the message exchanges occurring between a Manager, an Agent and an Instrumentation during another SNMP data retrieval process of the present invention when the last row of the table is reached.

In the case where a Manager issues a series of GetNextRequests to the Agent and spill-over occurs, i.e., an end of column is reached, the method and system of the present invention further reduces message flows between the SubAgent and the Instrumentation as compared to traditional methods and systems. This is shown in FIG. 7. Initially, the Manager requests the data item located in the last row (row m) of any column (column 1 is used as an example) using a GetNextRequest with the data item location specified (GetNext (m, 1)). Agent 36 forwards the GetNextRequest to SubAgent 40 via block 62. SubAgent 40 issues a GetNextRequest for the entire next row (GetNext (m, All Cols.)) to Instrumentation 42. Because the last row has been reached, there is not a "next row" to be retrieved by Instrumentation 42. Instrumentation 42 returns to the SubAgent 40 a noSuchName response (as it normally does when reaching the end of a column). But, in addition, it returns the data items of the first row (Resp (1, All Cols.)) along with the noSuchName response. This allows SubAgent 40 to select the second column of the first row and forward that value to Agent 36 using Resp (1, 2) which in turn sends the requested value to Manager 22. This eliminates the traditionally necessary step of the SubAgent forwarding the noSuchName response to the Agent, requiring additional message flows between the SubAgent/Instrumentation.

As was discussed above, if a request for a data item located in a different row is received by the SubAgent 40, the previously stored data for row 1, in this case, is discarded.

As can be seen, this portion of the method employed by the SubAgent further reduces the message flow between the SubAgent and the Instrumentation when the series of data items requested by the Manager spills over into the next column. This frees up additional processing time for the Instrumentation to provide its primary services.

Thus, it can be seen that the method and system of the present invention reduces the number of Instrumentation flows in a Simple Network Management Protocol (SNMP) device. The method and system use "look-ahead" algorithms whereby data items which have not yet been requested by the Agent (but are expected to be) are retrieved from Instrumentation. The method and system free up Instrumentation processing time by reducing flows. Further, the method and system can be easily expanded to return multiple rows as opposed to returning a single row which may result in an even greater reduction in flows to and from the Instrumentation. The number of rows returned would depend directly upon the Manager's GetRequest PDUs. For each new GetRequest or GetNextRequest PDU from the Manager, a new set of data is received from the instrumentation. Where data items from different rows are requested from a single GetRequest (or GetNextRequest) PDU, multiple rows containing the data items may be returned from the Instrumentation so that an accurate "snapshot" may be taken by the Manager. In addition, "old" data is discarded upon receipt of a request for data from a different row.

While the invention has been particularly shown and described with reference to preferred embodiments thereof, it will be understood by those skilled in the art that various other changes in form and detail may be made without departing from the spirit and scope of the invention.

What is claimed is:

1. For use in a network having at least one device and a manager for managing said at least one device in accordance with the Simple Network Management Protocol (SNMP), said at least one device being connected to said manager and supporting one or more resources, each of said one or more resources having a plurality of attributes, said at least one device comprising an agent having an internal storage area and an instrumentation, said instrumentation having at least one table for holding data representing said resources and said attributes, said at least one table having one or more rows representing said one or more resources and a plurality of columns representing said plurality of attributes, said at least one table having a plurality of data items in corresponding table locations defined by said one or more rows and said plurality of columns, in said instrumentation, a method for retrieving said data items from said table comprising the following steps:

receiving a first request from said agent for retrieving a data item from a table location defined by a last row and one of said columns;

sending to said agent, in response to said first request, said data item from said table location defined by said last row and said one column;

receiving a second request from said agent for retrieving the data item in the same column and a next subsequent row as the data item in a table location defined by said one column and said last row; and sending to said agent, in response to said second request, the data items in said first row.

2. The method of claim 1 further comprising the step of sending a noSuchName response to said agent in response to said second request from said agent for the data item located in said same column and said next subsequent row as the data item in said last row and said one column.

3. The method of claim 1 wherein said requests from said agent are in the form of GetNext commands and retrieve all of the data items in the next subsequent row.

4. The method of claim 1 wherein said at least one device includes a subagent having an internal storage area and acting as an interface between said instrumentation and said agent.

5. For use in a network having at least one device and a manager for managing said at least one device in accordance with the Simple Network Management Protocol (SNMP), said at least one device being connected to said manager and supporting first through last resources, each of said first through last resources having first through last attributes, said at least one device comprising an agent having an internal storage area and an instrumentation having at least one table for holding data representing said resources and said attributes, said at least one table having first through last rows representing said first through last resources and first through last columns representing said first through last attributes, said at least one table having a plurality of data items in corresponding table locations defined by said rows and said columns, said instrumentation further comprising:

means for receiving a first request from said agent for retrieving a data item from a table location defined by said last row and one of said columns;

means, responsive to said first request, for sending to said agent said data item from said table location defined by said last row and said one column;

means for receiving a second request from said agent for retrieving the data item located in the same column and a next subsequent row as the data item in a table location defined by said last row and said one column; and means, responsive to said second request, for sending to said agent the data items in said first row.

6. The instrumentation of claim 5 further comprising means for sending a noSuchName response to said agent in response to said second request from said agent for the data item located in said same column and said next subsequent row as the data item in said last row and said one column.

7. The instrumentation of claim 5 wherein said requests from said agent are in the form of GetNext commands and retrieve all of the data items in the next subsequent row.

8. The instrumentation of claim 5 wherein said at least one device includes a subagent having an internal storage area and acting as an interface between said instrumentation and said agent.

9. For use in a network having at least one device and a manager for managing said at least one device in accordance with the Simple Network Management Protocol (SNMP), said at least one device being connected to said manager and supporting first through last resources, each of said first through last resources having first through last attributes, a computer program product resident in said at least one device, said computer program product comprising computer readable program code representing (a) an agent having an internal computer readable storage medium, and (b) an instrumentation having at least one computer readable storage medium for storing at least one table containing data representing said resources and said attributes, said at least one table having first through last rows representing said first through last resources and first through last columns representing said first through last attributes, said at least one table having a plurality of data items in corresponding table locations defined by said rows and said columns, said computer readable program code representing said instrumentation further comprising:

computer readable program code for receiving a first request from said agent for retrieving a data item from a table location defined by said last row and one of said columns;

computer readable program code, responsive to said first request, for sending to said agent said data item from said table location defined by said last row and said one column;

computer readable program code for receiving a second request from said agent for retrieving the data item located in the same column and a next subsequent row as the data item in a table location defined by said last row and said one column; and computer readable program code, responsive to said second request, for sending to said agent the data items in said first row.

10. The computer readable program product of claim 9 wherein said computer readable program code representing said instrumentation further comprises computer readable program code for sending a noSuchName response to said agent in response to said second request from said agent for the data item located in said same column and said next subsequent row as the data item in said last row and said one column.

11. The computer readable program product of claim 9 wherein said computer readable program code representing said instrumentation receives said requests from said agent in the form of GetNext commands and retrieves all of the data items in the next subsequent row.

12. The computer readable program product of claim 9 further comprising computer readable program code representing a subagent having an internal computer readable storage medium and acting as an interface between said instrumentation and said agent.

* * * * *